United States Patent Office 3,362,932
Patented Jan. 9, 1968

3,362,932
POLYALKYLENE OXIDES STABILIZED WITH A COMBINATION OF THIO-BISPHENOLS AND ALIPHATIC SULFIDES
Otto Mauz, Frankfurt am Main, Germany, assignor to Farbwerke Hoechst Aktiengesellschaft vormals Meister Lucius & Bruning, Frankfurt am Main, Germany, a corporation of Germany
No Drawing. Filed Dec. 8, 1964, Ser. No. 416,910
Claims priority, application Germany, Dec. 14, 1963, F 41,545
3 Claims. (Cl. 260—45.85)

The present invention relates to stabilized polyalkylene oxides and a process for preparing them.

It is known that at an elevated temperature under the action of oxygen and light homopolymers and copolymers of alkylene oxides like all polyethers undergo more or less strong degradation reactions, so that they have to be stabilized before they are further processed or used.

It has been known that aromatic amines or phenols can be used as stabilizers for polypropylene oxide, for example. However, such stabilizers are little effective, in particular when the polymers are processed at a temperature above 100° C., and for example, at 110° C., they do not inhibit degradation at an elevated temperature, for example, at 110° C.

It has now been found that polyalkylene oxides can very well be stabilized when they are intimately mixed with a mixture comprising (a) a bisphenol of the formula

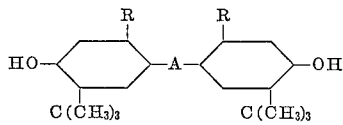

in which A represents an —S-group or —(CH$_2$)-group, preferably an —S-group, and R represents an alkyl group containing 1 to 3 carbon atoms, preferably 1 carbon atom, and (b) an aliphatic thioether of the general formula R—S$_n$—R, in which $n$ stands for an integer within the range of 1 to 4 and R represents an alkyl group containing 8 to 20 carbon atoms or the group —C(CH$_2$)$_m$—COO·R$_1$ in which R$_1$ represents an alkyl group containing 8 to 20 carbon atoms and $m$ is an integer within the range of 1 to 4, components (a) and (b) being contained in the mixture in a ratio within the range of 1:5 to 5:1 parts by weight.

As organic sulfur compounds there may be used, for example, di(dodecyl)sulfide, di(octadecyl)sulfide, di(dodecyl)disulfide, di(octadecyl)disulfide, di(dodecyl)trisulfide, di(octadecyl)trisulfide, di(dodecyl)tetrasulfide, di(octadecyl)tetrasulfide, thiodiglycolic acid dodecyl ester, thiodipropionic acid octadecyl ester, thiodibutyric acid dodecyl ester, dithiodiacetic acid dodecyl ester, dithiodipropionic acid dodecyl ester, trisulfide(diacetic acid octadecyl ester) and tetrasulfide(diacetic acid octadecyl ester).

In order to obtain a good stabilization the said stabilizer mixtures are preferably added in the solid state or in solution in an amount within the range of 0.3 to 3%, calculated on the weight of the polyalkylene oxide. It is particularly advantageous to add the stabilizer mixture already during the working up of the polymerization product directly after the polymerization process. It is, however, also possible to add the stabilizer mixture after the polymer has been worked up and is present in the solid state. When operating in this way the stabilizer mixture is preferably incorporated with the polymer with the exclusion of air by rolling, for example, on a mill comprising several rolls as is customary, for example, in the rubber industry or in an appropriate kneader or extruder.

As polymers which can be stabilized according to the invention there may be mentioned homopolymers and copolymers of alkylene oxides. The homopolymers can be prepared in the presence of a known ionic catalyst by polymerization of saturated alkylene oxides, for example, ethylene oxide, propylene oxide and isobutylene oxide; substituted epoxides, for example, epichlorohydrine, perfluoropropylene oxide and 1 - chloro - 3,4 - epoxybutane; cycloaliphatic epoxides, for example, cyclohexene oxide; or epoxy ethers, for example, methyl glycidyl ether and phenyl glycidyl ether. The copolymers are prepared in analogous manner by copolymerization of unsaturated epoxides with saturated epoxides, for example, allyl glycidyl ether, glycidyl acrylate, vinyl cyclohexene monoepoxide, cyclohexene oxide, butadiene monoxide and 1,2-epoxycyclooctene(5). Particularly good results are obtained when copolymers of saturated and unsaturated alkylene oxides are used and when they are stabilized immediately after their polymerization before they have been cross-linked.

The stabilized polymers which are obtained are crystalline, amorphous or of rubber-like consistency. The stabilizing effect of the compounds used according to the invention was examined in the following way:

The stabilizer which was dissolved in benzene was added to a solution of the polyalkylene oxide or the copolymer of alkylene oxide in benzene.

After having been mixed well the mixture was made into a film by evaporation of the benzene. This film was treated at 110° C. in a drying cabinet into which air was admitted.

At intervals of 24 hours samples were taken, a solution of 0.1% strength in benzene was prepared and the reduced specific viscosity was measured at 25° C. The diminution of the reduced specific viscosity is a measure of the degradation of the polymer by oxidation.

The following examples serve to illustrate the invention but they are not intended to limit it thereto.

The examples which are given in the form of tables illustrate the efficacy of the stabilizers according to the invention. The stabilizing effect was examined with a copolymer of propylene oxide and 1,2-epoxy-cyclo-octene-(5). The films were heat-treated at 110° C. Experiment 1 of Table I shows the behaviour of the unstabilized copolymer. Experiments 2 to 9 of Table I show the stabilizing effect of the individual components of the mixtures to be used according to the invention and experiments 10 to 15 of Table II show the stabilizing effect of the mixtures to be used according to the invention. It is evident that both components have a synergistic effect.

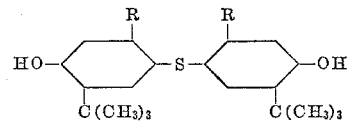

TABLE I

| Experiment No. | Stabilizer | Concentration of the stabilizer in percent by weight | Initial reduced viscosity | Reduced Viscosity after— | | |
|---|---|---|---|---|---|---|
| | | | | 1 day | 2 days | 3 days |
| 1 | None | | 16.0 | 0 | | |
| 2 | 4,4'-thio-bis(2-tert.butyl-5-methyl-phenol) | 1 | 16.2 | 10.0 | 5.1 | 3.2 |
| 3 | Di(octadecyl)sulfide | 1 | 16.2 | 3.3 | 0.1 | |
| 4 | Di(octadecyl)disulfide | 1 | 15.9 | 5.2 | 1.6 | |
| 5 | Di(octadecyl)trisulfide | 1 | 16.0 | 5.6 | 0.7 | |
| 6 | Di(octadecyl)tetrasulfide | 1 | 15.8 | 7.2 | 2.1 | |
| 7 | Trisulfide(diacetic acid octadecyl ester) | 1 | 16.1 | 7.1 | 3.8 | 0.1 |
| 8 | Tetrasulfide(diacetic acid octadecyl ester) | 1 | 16.0 | 7.3 | 3.5 | |
| 9 | Thio-dipropionic acid lauryl ester | 1 | 15.9 | 7.2 | 2.5 | |

TABLE II

| Experiment No. | Stabilizers | Concentration of the Stabilizer in percent by weight | Initial Reduced Viscosity | Reduced Viscosity after— | | | | | | | |
|---|---|---|---|---|---|---|---|---|---|---|---|
| | | | | 1 day | 2 days | 6 days | 10 days | 14 days | 20 days | 25 days | 30 days | 42 days |
| 10 | {4,4'-thio-bis(2-tert.butyl-5-methylphenol) / Thio-dipropionic acid dodecyl ester} | 0.5 / 0.5 | 16.0 | 12.0 | 11.2 | 9.4 | 8.4 | 7.4 | 5.7 | 5.6 | 5.0 | 3.7 |
| 11 | {4,4'-thio-bis(2-tert.butyl-5-methylphenol) / Di(octadecyl)disulfide} | 0.5 / 0.5 | 16.4 | 12.1 | 10.3 | 8.0 | 7.0 | 5.8 | 4.6 | 4.8 | 4.0 | 3.1 |
| 12 | {4,4'-thio-bis(2-tert.butyl-5-methylphenol) / Di(octadecyl)trisulfide} | 0.5 / 0.5 | 16.4 | 13.2 | 11.5 | 9.8 | 8.6 | 6.9 | 6.6 | 6.1 | 5.7 |
| 13 | {4,4'-thio-bis(2-tert.butyl-5-methylphenol) / Di(octadecyl)tetrasulfide} | 0.5 / 0.5 | 16.2 | 12.2 | 12.1 | 12.0 | 10.7 | 9.7 | 8.4 | 8.3 | 7.5 | 5.9 |
| 14 | {4,4'-thio-bis(2-tert.butyl-5-methylphenol) / Trisulfide(diacetic acid octadecyl ester)} | 0.5 / 0.5 | 16.1 | 12.0 | 11.4 | 9.5 | 8.0 | 7.0 | 4.6 | 4.5 | 3.8 | 3.3 |
| 15 | {4,4'-thio-bis(2-tert.butyl-5-methylphenol) / Tetrasulfide(diacetic acid octadecyl ester)} | 0.5 / 0.5 | 16.3 | 12.4 | 12.0 | 10.1 | 8.8 | 7.6 | 6.4 | 5.4 | 5.2 | 3.0 |

What I claim is:

1. A composition of matter comprising a member selected from the group consisting of homopolymers of alkylene oxides and copolymers of saturated epoxides with unsaturated epoxides and a stabilizing amount of a mixture comprising (a) a bisphenol of the formula

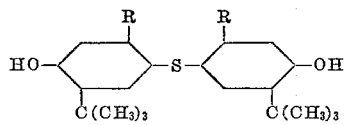

in which R represents an alkyl group containing 1 to 3 carbon atoms and (b) an aliphatic thioether of the general formula R—$S_n$—R, in which $n$ stands for an integer number within the range of 1 to 4 and R represents an alkyl group containing 8 to 20 carbon atoms or the group —C(CH$_2$)$_m$—COO·R$_1$ in which R$_1$ represents an alkyl group containing 8 to 20 carbon atoms and $m$ is an integer within the range of 1 to 4, components (a) and (b) being contained in the mixture in a ratio within the range of 1:5 to 5:1 parts by weight.

2. A composition of claim 1 wherein the mixture comprises 4,4'-thio-bis-(2-tert.butyl-5-methyl phenol) and di(octadecyl)disulfide.

3. A composition of matter comprising a member selected from the group consisting of homopolymers of alkylene oxides and copolymers of saturated epoxides with unsaturated epoxides and 0.3 to 3%, calculated on the weight of said member of a mixture comprising (a) a bisphenol of the formula in which R represents an alkyl group containing 1 to 3 carbon atoms, preferably 1 carbon atom, and (b) an aliphatic thioether of the general formula R—$S_n$—R, in which $n$ stands for an integer within the range of 1 to 4 and R represents an alkyl group containing 8 to 20 carbon atoms or the group —C(CH$_2$)$_m$—COO·R$_1$ in which R$_1$ represents an alkyl group containing 8 to 20 carbon atoms and $m$ is an integer within the range of 1 to 4, components (a) and (b) being contained in the mixture in a ratio within the range of 1:5 to 5:1 parts by weight.

References Cited

UNITED STATES PATENTS

| 2,706,189 | 4/1955 | Pruitt et al. | 260—45.95 |
| 2,942,033 | 6/1960 | Leis et al. | 260—611.5 |
| 3,240,753 | 5/1966 | Dolce | 260—45.95 |
| 2,945,837 | 7/1960 | Eifert et al. | 260—45.95 |
| 3,157,626 | 11/1964 | Hech | 260—45.95 |
| 3,204,014 | 8/1965 | Green | 260—45.95 |

FOREIGN PATENTS

| 1,117,868 | 11/1961 | Germany. |
| 971,262 | 9/1964 | Great Britain. |

DONALD E. CZAJA, Primary Examiner.

LEON J. BERCOVITZ, Examiner.

H. E. TAYLOR, JR., Assistant Examiner.